M. R. BROWN.
Improvement in Wheels for Vehicles.
No. 130,012.    Patented July 30, 1872.
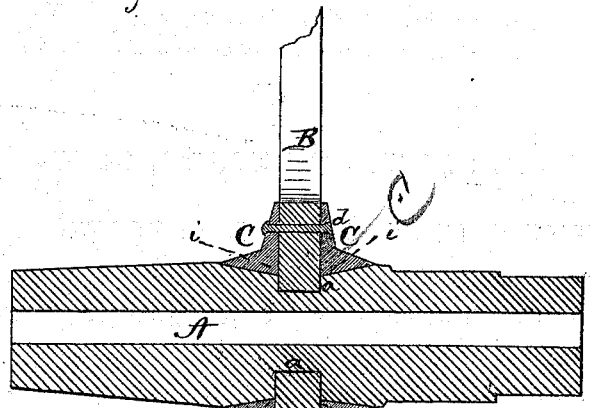
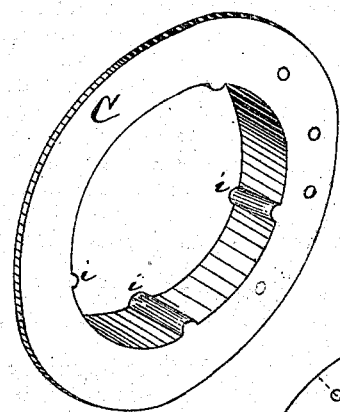
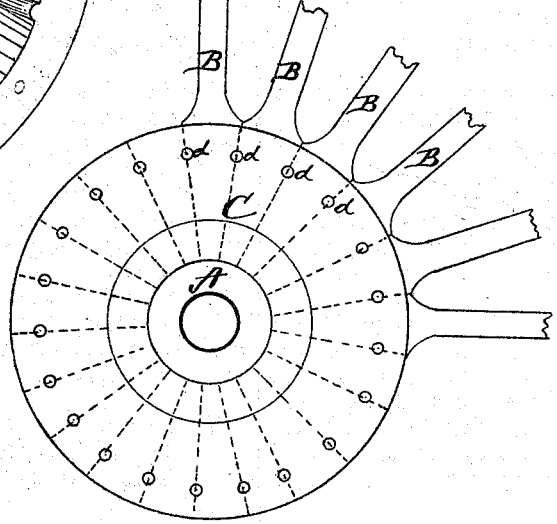

UNITED STATES PATENT OFFICE.

MARSHALL R. BROWN, OF MINGO, OHIO.

IMPROVEMENT IN WHEELS FOR VEHICLES.

Specification forming part of Letters Patent No. 130,012, dated July 30, 1872.

*To all whom it may concern:*

Be it known that I, MARSHALL R. BROWN, of Mingo, in the county of Champaign and in the State of Ohio, have invented certain new and useful Improvements in Wheels; and do hereby declare that the following is a full, clear, and exact description thereof, reference being had to the accompanying drawing and to the letters of reference marked thereon making a part of this specification.

The nature of my invention consists in the construction and arrangement of a "hub for vehicles," as will be hereinafter more fully set forth.

In order to enable others skilled in the art to which my invention appertains to make and use the same, I will now proceed to describe its construction and operation, referring to the annexed drawing, in which—

Figure 1 is a longitudinal vertical section of my hub. Fig. 2 is an end view of the same, and Fig. 3 is a perspective view of one of the collars.

A represents a wooden hub, provided with a circumferential groove, $a$, of suitable depth to receive the ends of the spokes B B. The inner ends of the spokes are wedge-shaped, as shown in Fig. 2, and when put in place come close together, forming an arch. C C represent two collars slipped over the ends of the hub A and against the spokes to hold them in place. On the under or inner sides of the collars C C are V-shaped beads $i$ $i$, which enter the wooden hub A, and thus prevent any circular motion of the hub in the collars. The groove $a$ in the hub keeps the spokes in their proper places and checks the lateral leverage of the same. The front collar C has countersunk holes to receive the heads of the rivets $d$ fitting in the same, thereby giving a smooth front for paint and finish. These rivets pass between the spokes B B, and secure the collars and spokes firmly together.

Having thus fully described my invention, what I claim as new, and desire to secure by Letters Patent, is—

The combination of the hub A having circumferential groove $a$, the spokes B B, and collars C C having V-shaped beads $i$ $i$ and countersunk holes to receive the heads of the rivets $d$ $d$, all substantially as and for the purposes herein set forth.

In testimony that I claim the foregoing I have hereunto set my hand this 10th day of January, 1871.

M. R. BROWN.

Witnesses:
 GEO. W. HUTCHINSON,
 FREMONT BROWN.